July 23, 1929.   W. WEILER   1,722,166

POWER FACTOR REGULATOR

Filed April 16, 1927

Inventor
Wilhelm Weiler,
by
His Attorney.

Patented July 23, 1929.

1,722,166

UNITED STATES PATENT OFFICE.

WILHELM WEILER, OF NIEDERSCHONHAUSEN, BERLIN, GERMANY, ASSIGNOR TO GENERAL ELECTRIC COMPANY, A CORPORATION OF NEW YORK.

POWER-FACTOR REGULATOR.

Application filed April 16, 1927, Serial No. 184,216, and in Germany June 14, 1926.

My invention relates broadly to the subject of power factor correction of alternating current circuits, and more specifically to apparatus for automatically controlling the excitation of induction machine cascade systems to maintain the power factor and load of the induction machine within desirable limits.

When an induction machine is provided with dynamo electric regulating apparatus in its secondary circuit, and this apparatus is automatically controlled in response to the load and power factor conditions of the machine, hunting between the load and power factor regulators tends to exist due to the fact that the regulation of power factor has some influence on the load, and likewise the regulation of the load has some influence on the power factor.

In my copending application, Serial No. 184,214 filed April 16, 1927, entitled Automatic regulation of induction motors, I have described how the hunting tendency may be overcome by the use of a quick-acting regulator for one of the factors, and a slow-acting regulator for the other factor. The present application relates to an improvement of such a system in which one of the automatic regulators comprises means for exciting a synchronous generator through a rectifying device, which rectifying device is arranged to rectify any desired current component, for example the wattless current component of the alternating circuit with which the synchronous generator is associated through the induction machine. Such regulation is practically instantaneous. The other component of the circuit, for example, the load component, is then controlled through a slow-acting regulator of any desired type. The inherent difference in the time operating period of the two regulating means prevents hunting between them. The idea of rectifying any desired current component of an alternating current circuit to obtain a corrective regulation is believed to be new and suitable for general application, and is claimed broadly.

Figure 1:
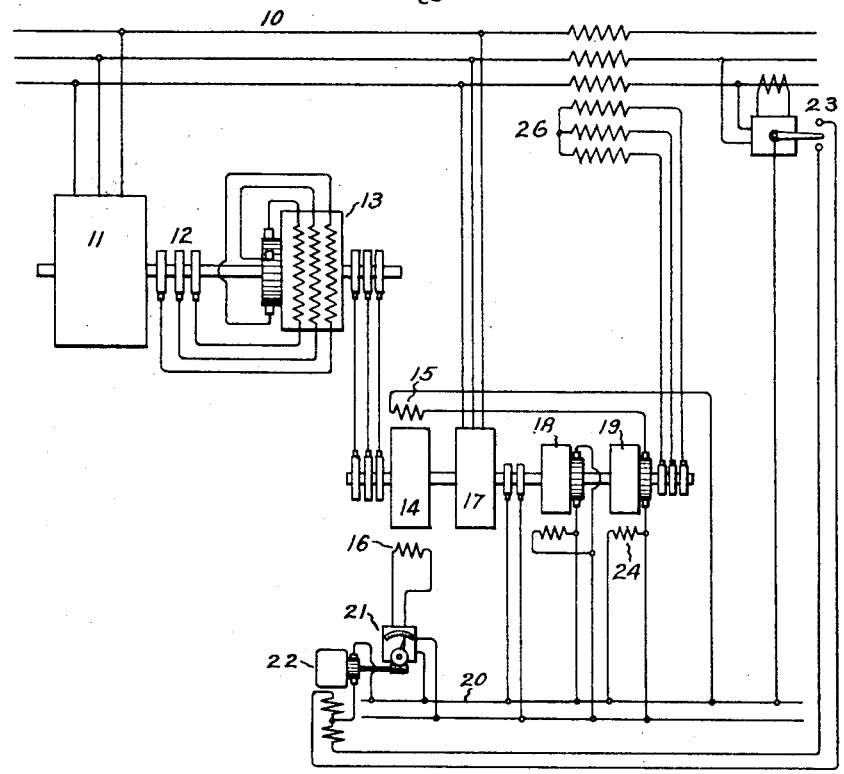

For a better understanding of my invention, reference is made in the following description to the accompanying drawing, in which Fig. 1 illustrates the application of my invention to an induction machine regulating system, and Fig. 2 a broader application of the invention, in which the synchronous machine is excited through a device for rectifying any desired out-of-phase current component of an alternating current circuit with which the synchronous machine is directly associated.

In Fig. 1, 10 represents an alternating current distribution system to which the induction machine 11 is connected. The induction machine may comprise one element of a frequency changer set and may thus act either as a motor or a generator. The secondary of machine 11 is brought out through slip rings 12 and connected to the commutator end of a commutator type frequency changer 13 driven with machine 11. The slip ring end of this frequency changer is supplied by a synchronous machine 14 represented as having stationary direct current field windings 15 and 16. The synchronous machine 14 is driven by a synchronous motor 17 which also drives a direct current exciter 18 and a synchronous rectifier machine 19. The field windings 15 and 16 of the synchronous machine 14 are arranged to produce quadrature related fluxes in the armature such that by varying the current in these windings the phase angle of the current generated by the machine and supplied to the frequency changer 13 may be varied through 90 electrical degrees. The magnitude of the voltage may likewise be controlled. The position of field 15 is chosen so that its regulation produces changes in the power factor of machine 11, and field 16 has a position chosen to regulate the load of machine 11. The position of the resultant flux of these two fields will obviously change when either field is regulated alone, and consequently variation of the load regulating field will have some influence upon the power factor, and vice versa. Winding 16 is supplied from the direct current bus 20, which is energized by the direct current exciter 18, and the strength of field 16 is automatically controlled by load responsive means. This means comprises a rheostat 21, a reversible pilot motor 22 for adjusting the rheostat, and a contact-making wattmeter 23 connected in the primary circuit of the induction machine 11. As a consequence, field 16 is automatically controlled in response to the load, and the contacts of the contact-making wattmeter may be adjusted to maintain the load between any desirable limits. Manual control may be had when desired, as, for example, in synchronizing operations, by merely moving the contacting arm of the wattmeter by hand.

The rectifier machine 19 may be constructed with a rotor like a rotary converter rotor, with the commutator and slip rings at the same end of the windings. It is wound for the same number of poles as the synchronous motor 17, and is driven thereby in synchronism with the frequency of line 10. It may, if desired, have a direct current field winding 24 on the stationary member. The direct current brushes are preferably adjustable, and supply the field winding 15 of the synchronous machine 14. Preferably, this exciting circuit is connected across the direct current bus 20 so that the voltage of the rectifier machine 19 bucks or boosts the voltage of the bus 20 in this circuit to regulate the current in field winding 15. The slip rings of the rectifier machine 19 are supplied from a series transformer 26 in the primary circuit of motor 11. There will be a voltage impressed upon the slip rings of the rectifier 19 which is in fixed phase relation with and is proportional to the current in circuit 10. The voltage across the brushes will be proportional to the slip ring voltage for a given brush position and phase angle of the slip ring voltage, but the brush voltage will vary with variations in the phase angle of the slip ring voltage caused by variations in power factor of circuit 10. For example, assume circuit 10 is operating at constant load at unity power factor. For a given brush position of machine 19, the brush voltage will be a maximum, but if the brushes are then shifted 90 electrical degrees the brush voltage will be zero. Likewise, if the brushes remain stationary and the power factor changes from 1. to 0, the same result will be produced. Thus, if the brushes are set in such a position that the rectified voltage is zero at unity power factor the brush voltage will increase with decrease in power factor, and we can thus rectify the wattless current component of circuit 10. If we shift the brushes 90 electrical degrees, we can rectify the watt or in-phase current component of circuit 10. For some intermediate position, we can rectify a current having any desired phase relation to the power and wattless components. It is thus seen that by this arrangement we may vary the field current in 15 in proportion to any desired phase angle component of the current in circuit 10. The winding 24 on the stator of the rectifier machine is not essential, but, when used, it serves as a convenient means of adjustment since its adjustment modifies the brush voltage by modifying the resultant flux of the armature. Where the exciting circuit of winding 15 is connected in series with the rectifier and across the bus 20, the amount of regulating current required to be drawn from the transformer 26 is small. Let us assume that it is desired to hold .9 leading power factor on circuit 10. The current in winding 15 will then be adjuusted external of the rectifier, so that under normal load conditions the power factor of motor 11 is .9 leading, and the brushes of the rectifier will be set at the zero voltage position. Then when the power factor changes from .9 leading, the voltage of the rectifier will buck or boost the voltage of the bus 20 and decrease or increase the current in winding 15 in a manner to oppose the change in power factor.

This regulation is instantaneous. The load regulation on the other hand takes place much more slowly after the load condition changes. Consequently, no hunting between the two regulations exists.

Figure 2:
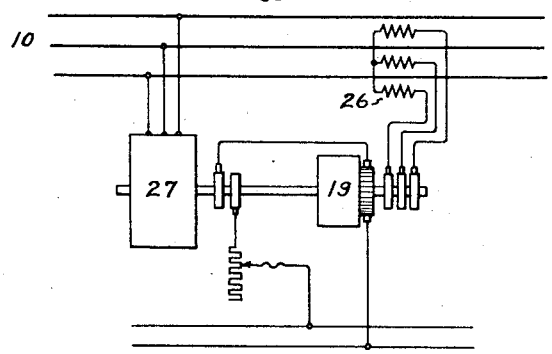

In Fig. 2 the synchronous machine which is excited through the rectifier 19 comprises a synchronous condenser 27 connected directly to the line 10. The rectifier and synchronous machine have the same number of poles. The rectifier is energized by a series transformer 26, and the exciting circuit of the synchronous machine is connected across a direct current source 10 in series with the rectifier brushes. By properly positioning the brushes of the rectifier, any desired approximate power factor condition of circuit 10 may be automatically maintained.

In accordance with the provisions of the patent statutes, I have described the principle of operation of my invention, together with the apparatus which I now consider to represent the best embodiment thereof, but I desire to have it understood that the apparatus shown and described is only illustrative, and that the invention may be carried out by other means.

What I claim as new, and desire to secure by Letters Patent of the United States, is:

1. In combination with an alternating current circuit, an asynchronous induction machine connected thereto, power factor regulating means associated with the secondary circuit of said induction machine, including a synchronous generator, and automatic means for controlling the power factor of said asynchronous machine comprising means for rectifying a predetermined phase angle component of its primary current for exciting said generator.

2. In combination with an alternating current circuit, an asynchronous induction machine connected thereto, a frequency changer driven with said induction machine and connected in series with its secondary, a synchronous generator supplying said frequency changer, a direct current field winding on said generator, and means for rectifying a predetermined adjustable phase angle component of the primary current of said induction machine for energizing said field winding.

3. In combination with an alternating current circuit, an induction machine connected thereto, means for controlling the secondary excitation of said induction machine including a synchronous generator, a pair of direct current field windings on said generator arranged to produce load regulating and power factor regulating excitations respectively, means responsive to the load of said induction machine for controlling the load regulating field excitation of said synchronous generator, and means for rectifying a predetermined phase angle component of the primary current of said induction machine for supplying power factor regulating excitation to said synchronous generator.

In witness whereof, I have hereunto set my hand this 26th day of March, 1927.

WILHELM WEILER.